United States Patent Office 3,803,199
Patented Apr. 9, 1974

3,803,199
PREPARATION OF PERFLUOROALKYL-
SULFONYLARYL ESTERS
Peter Voss, Leverkusen, Hans Niederprum, Monheim, and
Volker Beyl, Leverkusen, Germany, assignors to Bayer
Aktiengesellschaft, Leverkusen, Germany
No Drawing. Filed Sept. 28, 1970, Ser. No. 76,255
Claims priority, application Germany, Oct. 17, 1969,
P 19 52 387.6
Int. Cl. C07c *143/08*
U.S. Cl. 260—456 A       3 Claims

ABSTRACT OF THE DISCLOSURE

A process for the production of a perfluoroalkylsulfonic acid aryl ester comprising reacting a perfluoroalkylsulfonyl fluoride, wherein the alkyl group has up to about 12 carbon atoms, with an aryl ester of a silicic acid at a temperature of about 20 to 300° C. in the presence of a catalyst. The aminosubstituted-aryl esters are new compounds especially useful as surfactants, textile-impregnating agents, foam stabilizers, insecticides and herbicides, and are also claimed.

---

This invention relates to novel perfluoroalkylsulfonylaryl esters and to a process for the production of perfluoroalkylsulfonylaryl esters in general. The chemical reaction on which the new process is based proceeds in accordance with the equation:

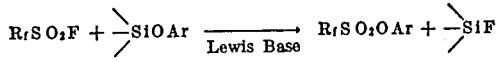

Hithereto, perfluoroalkylsulfonylaryl esters have been obtained by reacting perfluoroalkylsulfonyl fluorides with phenols in the presence of stoichiometric quantities of strongly basic tertiary amines or with alkali metal phenolates in an inert solvent, c.f. United States patent specification No. 3,346,612. Unfortunately, the perfluorocompounds used have to be employed in the highly pure form because otherwise secondary reactions accompanied by tar formation occur under the strongly basic reaction conditions. In addition, the reactions have to be carried out under non-oxidizing conditions (inert gas) in order to prevent oxidation of the phenols. Finally, it is not possible in the process disclosed in the aforementioned United States Patent Specification directly to react phenols carrying certain substituents on the aromatic nucleus, for example the NH₂ group.

A process for the production of a perfluoroalkylsulfonylaryl ester of the general formula:

$$(R_FSO_2O)_xAr$$

has now been found in which a perfluoroalkylsulfonylfluoride of the formula $R_FSO_2F$ in which $R_F$ represents a linear or branched perfluorinated aliphatic hydrocarbon radical with from 1 to 12 carbon atoms, is reacted with a silicic acid aryl ester of the general formula

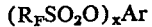

in which R represents a methyl, ethyl or phenyl radical, n is an integer from 0 to 3, x is an integer generally up to about 1 and preferably 1 or 2, and Ar represents substituted or unsubstituted individual or condensed aromatic nuclei which may be connected through bridge members and which may be isocyclic or heterocyclic and contain x silyloxy groups, at a temperature of from about 20 to 300° C. in the presence of a catalyst.

The process according to the invention obviates the difficulties involved in the conventional process because the silylated phenols used are extremely stable and do not enter into any secondary reactions. They can readily be obtained simply by reacting the aromatic hydroxy compound with a suitable silicon compound, for example a silazane such as hexamethyl disilazane or a chlorosilane such as those of hydrocarbons, particularly aromatic and alkyl, advantageously lower alkyl, for example trimethylchlorosilane, dimethyldichlorosilane, methyltrichlorosilane triethylchlorosilane, diethyldichlorosilane, ethyltrichlorosilane, triphenylchlorosilane, phenyltrichlorosilane, or tetrachlorosilane, and the like. In addition, the aromatic silyloxy compounds can be obtained by reacting the fluorosilane formed during the reaction according to the invention with fresh phenol, thus increasing the economy of the process. These silicic acid aryl esters are generally in the form of liquids which are easy to distil and hence easy to purify and use in controlled quantities. The silicic acid aryl esters used in accordance with the invention correspond to the general formula $$R_nSi(OAr)_{4-n} \quad (n=0-3)$$

in which R represents a methyl, ethyl or phenyl radical and Ar represents substituted or unsubstituted aromatic nuclei which may be isocyclic (benzenes and naphthalenes) or heterocyclic (for example pyridines, quinolines, thiophenes, pyrroles, pyrimidines, pyrazines, triazines, furanes and condensed aromatic heterocompounds). The aromatic nuclei may contain one or more silylated phenolic hydroxyl groups.

Examples of aromatic substituents include amino, alkyl amino, nitro, alkyl, alkenyl, halogenalkyl, halogen, carboxyl, carbalkoxy, sulfo, alkoxy, acyloxy, and acylamino groups. In addition, the aromatic compounds may be condensed with similiar or different substituted or unsubstituted aromatic nuclei or attached directly or even through a bridge member. In this case, all, some or only one of the aromatic rings can contain reactive silyloxy groups.

Ar preferably represents substituted or unsubstituted phenyl, naphthyl, pyridine, pyrimidine and quinoline radicals, amino, carboxyl, alkenyl and/or nitro groups preferably being used as the reactive groups. The following are examples of silylatable and hence suitable aromatic hydroxy compounds: phenol, 4-isopropenylphenol, 4-aminophenol, 2,4-diaminophenol, 3-aminophenol, 2-nitro-4-chlorophenol, 2-naphthol, 2,4-dichlorophenol, 4-nitrophenol, 3-trifluoromethylphenol, hydroquinone, resorcinol, pyrocatechol, 4-benzylphenol, salicyclic acid, 4-hydroxybenzoic acid, pentachlorophenol, cresol, 2-hydroxy cumene, nonylphenol, 4-carbethoxyphenol, 3-hydroxypyridine, 2-hydroxybiphenyl bis-(4 - hydroxyphenyl)-sulfone, 1,3-dihydroxynaphthalene, 2,2-bis-(4-hydroxpyhenyl)-propane, 1,3-bis-(4-hydroxybenzooxymethyl)-tetramethyl disiloxane, 5-amino - 1 - hydroxynaphthalene, 4-amino -2-hydroxy-4,6-diaminopyrimidine, -hydroxy-5-aminopyridine, 2,6 - dihydroxy-4-carboxypyridine 8-hydroxyquinoline 2-hydroxy-5-carboxypyridine, 2 - hydroxypyrimidine 2-hydroxy-5-nitropyridine and the like.

The perfluoroalkylsulfonyl fluorides required for the production of perfluoroalkylsulfonyl aryl esters by the process according to the invention can be obtained by electrofluorination of the corresponding alkylsulfonylhalides or cyclic sulfones. The following are examples:

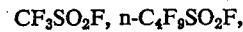

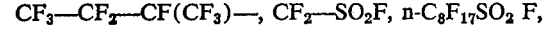

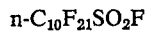

The reaction on which the process according to the invention is based is carried out in the presence of a basic catalyst. Suitable catalysts include amine bases, metal fluorides, especially alkali metal fluorides and tetraalkylammonium fluorides. The effectiveness of the amine bases as catalysts is directly related to their basicity and depends furthermore on the presence of small amounts of fluorides. These fluorides however are normally present due to the small content of HF in the perfluorosulfonyl fluorides used. Examples of suitable bases include triethylamine, pentamethyl diethylene triamine and 2,2,4-trimethyl-2-silamorpholine, dimethylbenzylamine, and the like.

The activity of the metal fluoride catalysts is also governed by the basicity, i.e. ionogenity of the fluorine ions. This catalytic effect therefore may be referred to also as fluoride ions catalysis. The following gradation of the catalytic activity of the alkali metal fluorides was observed: CsF>RbF>KF>NaF>LiF. The catalytic activity of NaF and LiF is limited.

One major advantage of the process according to the invention for the production of perfluoroalkylsulfonylaryl esters is that it can be carried out economically. The perfluorosulfonylaryl esters are isolated in extremely high yields which are usually in excess of 90% of the theoretical. Accordingly, the loss during the reaction of the valuable perfluoroalkylsulfonyl fluorides is kept to a minimum. This result is attributable to the fact that the reaction is substantially quantitative, being accompanied by the formation of the fluorosilane escaping, and in many cases the aryl ester formed can be processed by straightforward vacuum distillation. Although the reaction can be carried out in the presence of a solvent or inert diluent, this is generally not necessary. Since in many cases the processing of the reaction solution is difficult and accompanied by losses of yield, it is preferred to operate in the absence of solvents.

In cases where solvents are required, such solvents as for example ether, tetrahydrofurane, dioxane, acetonitrile, ligroin and other inert organic solvents may be used. The reactions can be carried out in an autoclave, which is particularly advisable in cases where the boiling points of the starting materials used do not allow the necessary reaction temperature at normal pressure. As a rule pressures of from about 1 to 20 atmospheres are used. The reaction may be carried out at a temperature in the range of from about 20 to 300° C. and preferably in a range of from about 50 to 150° C.

It is possible by virtue of the process according to the invention to obtain perfluoroalkylsulfonylaryl esters which hitherto have not been described in the literature. For example, it is possible to obtain aminosubstituted aryl esters of perfluoroalkylsulfonic acid corresponding to the general formula $(R_FSO_2O)_xAr(NH_2)_y$, in which $R_F$ represents a linear or branched perfluorinated aliphatic hydrocarbon radical containing from 1 to about 12 carbon atoms, Ar represents substituted or unsubstituted individual condensed aromatic nuclei which may be attached through bridge members and which may be isocyclic or heterocyclic, $x$ is an integer of at least 1 and $y=1$ or 2. $x$ is also limited by the nature of the aromatic nucleus and also by the number of its substituents. By virtue of the process according to the invention, it has also been possible for the first time to obtain heteroaryl esters of sulfonic acids as further derivatives of perfluoroalkylsulfonic acid. These heteroaryl esters of perfluoroalkylsulfonic acid correspond to the general formula $$(R_FSO_2O)_xAr_h,$$

in which $R_F$ and $x$ are as defined above, whilst $Ar_h$ represents a substituted or unsubstituted aromatic heterocompound, preferably an aromatic heteronitrogen compound such as pyridine, a pyrimidine or a quinoline.

In contrast to the perfluoroalkylsulfonylalkyl esters which exhibit a marked effect as an alkylating agent (cf. T. Gramstad and R. N. Haszeldine, J. Chem. Soc., London, 1957, 4069, R. E. Banks and R. N. Haszeldine in "The Chemistry of Organic Sulphur Compounds" Pergamon Press, Oxford, 1966, chapter 6, p. 169), perfluorosulfonylaryl esters are stable compounds which, as organo functional perfluoroalkyl derivatives, may be used with advantage as surfactants, textile-impregnating agents, foam stabilizers, insecticides and herbicides, especially the aminosubstituted-aryl esters of the formula

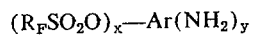

wherein $R_F$ is the perfluoroalkyl group, Ar is a phenyl, naphthyl, pyridine, pyrimidine or quinoline radical, $x$ is 1 or 2, and $y$ is 1 or 2.

The process according to the invention is illustrated by the following examples:

EXAMPLE 1

Perfluorobutylsulfonic acid phenylester 166 g. (1.0 mole) of trimethylphenoxy silane and 372 g. (1.25 moles) of 97.4% perfluorobutylsulfonyl fluoride were brought to the boil and with vigorous stirring in the presence of 3 ml. of triethylamine as catalyst in a 1 liter capacity three-necked flask equipped with a stirring mechanism, reflux condenser and a thermometer. The trimethylfluorosilane which had been expected as a product of the reaction (B.P.$_{760}$ 15.8° C.) distilled over through the condenser kept thermostatically at 25° C. and was recorded by a bubble counter. A gas sample collected was identified through the infrared spectrum as trimethylfluorosilane. The end of the reaction is reflected in a stoppage of the evolution of gas, in an increase in the temperature beyond that of the boiling point of the perfluorobutylsulfonylfluoride (67° C.) and in the transition of the two-phase reaction mixture into a single phase. The excess perfluorobutylsulfonyl fluoride was collected in a $CO_2$-cooled trap during fractional distillation in a water-jet vacuum. The required product distilled over in the form of a colorless liquid at B.P.$_{.12}$ 101° C. Yield 354 g. (94% of the theoretical); $n_D^{20}$ 1.3950.

*Analysis.*—Calc'd: 31.9% C; 1.3% H; 45.5% F; 8.5% S. Found: 32.1% C; 1.1% H; 45.2% F; 8.4% S.

EXAMPLE 2

Activity of different catalysts

The activity of different catalysts was investigated, for example, in the reaction between trimethylphenoxysilane and perfluorobutylsulfonyl fluoride to form the perfluorobutylsulfonylphenyl ester. The tests were carried out under standardized conditions and the different catalysts were qualitatively assessed in regard to reaction time, yield and the trimethylfluorosilane evolution rate.

In the case of mixtures consisting of 8.3 g. (0.05 mole) of phenoxysilane and 15.1 g. (0.05 mole) of perfluorobutylsulfonyl fluoride, 1 cc. of tertiary amine and 0.5 g. of metal fluoride was added as catalyst. The results are as follows:

| | |
|---|---|
| Triethylamine | ++ |
| 2,2,4-trimethyl-2-silamorpholine | ++ |
| Dimethylbenzylamine | ++ |
| Pentamethyldiethylene triamine | ++ |
| Triethylene diamine | + |
| N-methylmorpholine | + |
| Pyridine | − |
| Caesium fluoride | ++ |
| Rubidium fluoride | ++ |
| Potassium fluoride | + |
| Sodium fluoride | − |
| Lithium fluoride | − |
| ++ | Very good. |
| + | Good. |
| − | Barely adequate. |

EXAMPLE 3

Perfluorobutylsulfonic acid phenylester 259 g. (0.53 mole) of dimethyl diphenoxy silane and 322 g. (0.53 mole) of 96.5% perfluorobutylsulfonyl fluoride were heated under reflux in the presence of a catalytic quantity of triethylamine. Dimethyl difluorosilane (B.P. +2.2° C.) distilled off overhead. The sump temperature rose gradually to 120° C. The contents of the reaction flask consisted of an orange-red homogeneous liquid. The reaction product was distilled in a water-et vacuum. The yield was 361 g. (90.5% of the theoretical) of a water-clear liquid of B.P.$_{10}$ 97.0° C.; $n_D^{20}$ 1.3950.

*Analysis.*—Calc.: 31.9% C; 13% H; 45.5% F; 8.5% S. Found: 32.5% C; 1.6% H; 44.0% F; 8.8% S.

EXAMPLE 4

Trifluoromethylsulfonic acid phenylester 83 g. (0.5 mole) of trimethylphenoxysilane and 5 ml. of triethylamine were added to a 350 ml. capacity steel autoclave. The autoclave was cooled in Dry-Ice-acetone and loaded with 153 g. (1.0 mole) of trifluoromethylsulfonyl fluoride. The autoclave was heated to 100° C. over a period of 3 hours and left at this temperature for another 3 hours. The maximum pressure was 6.0 atms. gauge. The autoclave when cooled to room temperature showed a residual pressure of 2.0 atms. gauge. The system was vented through a reducing valve and the reddish-brown reaction product was fractionally distilled. The yield was 112 g. (99.0% of the theoretical) of a water-clear liquid of B.P.$_{14}$ 66.0° C.; $n_D^{20}$ 1.4338.

*Analysis.*—Calc.: 37.2% C; 2.2% H; 25.2% F; 14.2% S. Found: 37.6% C; 2.3% H; 24.4% F; 13.8% S.

EXAMPLE 5

Perfluorobutylsulfonic acid α-naphthylester 216 g. (1 mole) of trimethyl-α-naphthoxysilane and 376 g. (1.2 moles) of 96.5% perfluorobutylsulfonyl fluoride were stirred intensively in the presence of 5 ml. of triethylamine and heated to the boiling point of the $C_4F_9SO_2F$. As the reaction progressed, the two phases combined to form a dark red liquid. No more trimethylfluorosilane escaped at a sump temperature of 100° C. The reaction product solidifying in the cold was distilled in vacuo. The yield was 409 g. (96% of the theoretical) of colorless crystals. M.P. 44° C. B.P.$_{.1}$ 115° C. The product was identified by $^1$H—NMR and $^{19}$F—NMR spectroscopy.

EXAMPLE 6

Perfluorobutylsulfonic acid resorcylester 254 g. (1.0 mole) of 1,3-bis-(trimethylsilyloxy)benzene were heated while stirring with 689 g. (2.2 moles) of 96.5% perfluorobutylsulfonyl fluoride in the presence of a catalytic quantity of triethylamine in a 1 liter capacity 2-necked flask. The reaction was over after 3 hours. At a sump temperature of 120° C., the reaction product was in the form of a dark liquid which solidified in the cold. It was purified by distillation at B.P.$_{0.3}$ 118° C. The yield was 622.5 g. (92.7% of the theoretical) of a colorless solid of M.P. 35° C.

*Analysis.*—Calc.: 24.9% C; 0.6% H; 50.7% F; 9.6% S. Found: 25.1% C; 1.0% H; 49.7% F; 9.6% S.

EXAMPLE 7

Perfluorobutylsulfonic acid 4-benzylphenylester 64.0 g. (0.25 mole) of trimethyl-(4-benzylphenoxy)-silane and 94 g. (0.3 mole) of 96.5% perfluorobutylsulfonyl fluoride were heated while stirring in the presence of triethylamine. The contents of the flask underwent a change in color to form a gold-brown one-phase liquid, accompanied by the evolution of gas. Fractional distillation gave a pale yellow colored liquid in a yield of 108 g. (92.3% of the theoretical), B.P.$_{-3.2}$ 163° C., $n_D^{20}$ 1.4576.

The product was identified by IR $^1$H—NMR and $^{19}$F—NMR spectroscopy.

*Analysis.*—Calc.: 43.8% C; 2.4% H; 36.7% F; 6.8% S. Found: 43.8% C; 2.4% H; 36.9% F; 6.8% S.

EXAMPLE 8

3-perfluorobutylsulfonyloxypyridine 83.5 g. (0.5 mole) of 3-trimethylsilyloxy pyridine were heated while stirring with 181 g. (0.6 mole) of perfluorobutylsulfonyl fluoride and 0.5 g. of caesium fluoride as catalyst until the evolution of trimethylfluorosilane was over. Fractional distillation gave at B.P.$_{0.7}$ 80–83° C. 173 g. of a colorless oil which was identified through its IR, $^1$H—NMR and $^{19}$F—NMR spectra as 3-perfluorosulfonyloxypyridine. Gas-chromatographic purity 98.5%; yield 90.4% of the theoretical.

*Analysis.*—Calc.: 28.7% C; 1.1% H; 45.5% F; 3.7% N; 8.5% S. Found: 29.7% C; 1.6% H; 44.7% F; 3.8% N; 8.7% S.

EXAMPLE 9

3-perfluorobutylsulfonyloxypyridine 83.5 g. (0.5 mole) of 3-trimethylsilyloxy pyridine and 188 g. (0.6 mole) of 96.5% perfluorobutylsulfonyl fluoride were heated to a maximum of 159° C. in the presence of 5 ml. triethylamine in a steel autoclave. The reaction time was 5 hours and the maximum pressure 11.6 atms. gauge. The contents of the autoclave consisted of a dark brown liquid which was fractionally distilled. Yield 178 g. (94.2% of the theoretical) of a pale yellow liquid of B.P.$_{.1}$ 88° C.; $n_D^{20}$ 1.3959.

*Analysis.*—Calc.: 28.7% C; 1.1% H; 45.4% F; 3.7% N; 8.5% S. Found: 28.6% C; 1.2% H; 45.3% F; 3.8% N; 8.4% S.

EXAMPLE 10

Perfluorobutylsulfonyl-4-trifluoromethylphenylester

In a 500 ml. capacity two-necked flask, 46.8 g. (0.2 mole) of trimethyl-4-trifluoromethylphenoxysilane (prepared from 4-trifluoromethylphenol and hexamethyldisilazane) and 72.4 g. (0.24 mole) of perfluorobutylsulfonyl fluoride were brought to the boil while stirring the presence of 3 ml. of triethylamine, the reflux condenser being kept at a temperature of substantially 25° C. to allow the trimethylfluorosilane formed (boiling point 15.8° C.) to escape. After the evolution of the gas had stopped and the originally two-phase reaction mixture had been converted into one phase, the product was fractionally distilled. At B.P.$_{0.7}$ 71–72° C., 87.3 g. of an oil of which 95.3% consisted of the required product according to a gas chromatograph, distilled over. Yield 93.7% of the theoretical; $n_D^{20}$ 1.3786.

The reaction product was identified through its IR, $^1$H—NMR and $^{19}$F—NMR spectra.

*Analysis.*—Calc.: 29.7% C; 0.9% H; 51.4% F; 7.2% S. Found: 30.1% C; 1.1% H; 50.2% F; 7.3% S.

EXAMPLE 11

Perfluorobutylsulfonic acid 2,4-dichlorophenylester

In a 1 liter two-necked flask, 235 g. (1.0 mole) of trimethyl 2,4-dichlorophenoxysilane and 313 g. (1 mole) of 96.5% perfluorobutylsulfonyl fluoride were heated with vigorous stirring in the presence of 10 ml. of diethylamine. During a vigorous evolution of gas, the sump temperature gradually rose to 84° C. The reaction product distilled over in the form of a colorless liquid which solidified at room temperature.

The yield was 427 g. (96.0% of the theoretical), M.P. 41° C., B.P.$_{.3}$ 99° C.

*Analysis.*—Calc.: 27.0% C; 0.7% H; 16.0% Cl; 38.4% F; 7.2% S. Found: 27.5% C; 1.2% H; 16.2% Cl; 37.5% F; 7.5% S.

EXAMPLE 12

Perfluorobutylsulfonic acid-2-nitro-4-chlorophenylester 172 g. (0.7 mole) of trimethyl-2-nitro-4-chlorophenoxysilane, 217 g. (0.7 mole) of 97.6% perfluorobutylsulfonyl fluoride and 10 ml. of triethylamine were introduced into a 1 liter two-necked flask equipped in the conventional manner. The two phases combined to form a homogeneous solution following the addition of 250 ml. of ether. The contents of the flask were heated under reflux for approximately 24 hours. A vigorous stream of gaseous trimethylfluorosilane escaped. The ether was then distilled off and the reaction product fractionated in vacuo. The yield came to 238 g. (74.6% of the theoretical) of a yellow crystalline substance of B.P. 103° C. M.P. 48° C.

The reaction product was identified by $^1$H—NMR and $^{19}$F—NMR spectroscopy.

EXAMPLE 13

Perfluorobutylsulfonic acid-4-nitrophenylester

In a 500 ml. two-necked flask, 106 g. (0.5 mole) of trimethyl-4-nitrophenoxysilane and 188 g. of (0.6 mole) of 96.5% perfluorobutylsulfonyl fluoride were heated while stirring in the presence of a catalytic quantity of triethylamine. During a vigorous evolution of gas, a dark red single-phase solution was formed. The test was stopped at a sump temperature of 76° C. The contents of the flask solidified at room temperature. After fractional distillation, an intensively yellow colored crystalline product accumulated. The yield came to 205 g. (96.6% of the theoretical), M.P. 65° C., B.P.$_{0.7}$ 112.5° C.

*Analysis.*—Calcd.: 28.5% C; 0.9% H; 40.7% F; 3.3% N; 7.6% S. Found: 29.1% C; 1.3% H; 39.5% F; 3.4% N; 7.6% S.

EXAMPLE 14

Perfluorobutylsulfonic acid-4-carbethoxy phenylester 119 g. (0.5 mole) of trimethyl-4-carbethoxy phenoxysilane and 188 g. (0.6 mole) of 96.5% perfluorobutylsulfonyl fluoride were heated under reflux with 5 ml. of triethylamine. During vigorous evolution of gas, the sump temperautre rose gradually to 100° C. The contents of the flask consisted of a gold brown liquid. The yield came to 219.3 g. (97.8% of the theoretical) of a pale yellow liquid of B.P.$_{.5}$ 142° C.; $n_D^{20}$ 1.4178.

*Analysis.*—Calcd.: 34.8% C; 2.0% H; 38.1% F; 7.2% S. Found: 35.7% C; 2.3% H; 37.7% F; 7.0% S.

EXAMPLE 15

Perfluorobutylsulfonic acid-3-aminophenylester 362 g. (2.0 moles) of trimethyl-3-aminophenoxysilane, 665 g. (2.2 moles) of perfluorobutylsulfonyl fluoride and 5 ml. of triethylamine were heated with intensive stirring in a 1 liter two-necked flask equipped with a reflux condenser, thermometer and magnetic stirrer. The reflux condenser was kept thermostatically at a temperature of 25° C. so that the trimethylfluorosilane formed (B.P. +15.8° C.) could escape from the system and condense (175 g.=1.9 moles of Me$_3$SiF were isolated). As the reaction progressed, the two phases combined very clearly to form a homogeneous solution. The sump temperature rose gradually to 100° C. The gold brown reaction product was fractionally distilled in a high vacuum. The yield of C$_4$F$_9$SO$_2$·O·C$_6$H$_4$NH$_2$ came to 775 g. (97.9% of the theoretical). The product was 98.7% pure as determined by gas chromatography. B.P.$_{0.6}$ 107° C.; $n_D^{20}$ 1.4263. The product was identified by elementary analysis, IR, $^1$H—NMR and $^{19}$F—NMR spectroscopy.

*Analysis.*—Calcd.: 30.7% C; 1.6% H; 43.8% F; 3.6% N; 8.2% S. Found: 30.9% C; 1.9% H; 43.4% F; 3.7% N; 8.3% S.

EXAMPLE 16

Perfluorooctylsulfonic acid phenylester 127 g. (0.25 mole) of 98% perfluorooctylsulfonyl fluoride and 41.5 g. (0.25 mole) of trimethylphenoxysilane were introduced together with 4 ml. of trimethylamine into a three-necked flask equipped with a stirrer mechanism, reflux condenser and a thermometer. The starting compounds combined with one another when heated to 100° C. and began to react, accompanied by the evolution of trimethylfluorosilane. On completion of the reaction, the reaction mixture was distilled. 133 g. of a viscous oil distilled over at B.P.$_{1.5}$ 110° C., crystallizing after a short time, M.P. 32–33° C. Yield 93.7% of the theoretical. The reaction product was identified by its IR, $^1$H—NMR and $^{19}$F—NMR spectra.

EXAMPLE 17

Perfluorobutylsulfonic acid-p-isopropenylphenylester 89 g. (0.4 mole) of 92.5% trimethyl-p-isopropenylphenoxy silane and 125.2 g. (0.4 mole) of 96% perfluorobutylsulfonyl fluoride were heated to reflux in the presence of 3 ml. of triethylamine. After the evolution of trimethylfluorosilane had stopped, the reaction mixture was distilled. At B.P.$_{1.0}$ 92–93° C. it was possible to collect 158 g. of a liquid distillate which was identified through its IR, $^1$H—NMR and $^{19}$F—NMR spectra as being the required product. Purity as determined by gas chromatography 94.5%. Yield 90.0% of the theoretical; $n_D^{20}$ 1.4318.

*Analysis.*—Calcd.: 37.5% C; 2.2% H; 51.3% F; 7.7% S. Found: 38.7% C; 2.5% H; 42.1% F; 7.4% S.

EXAMPLE 18

2,2-bis-(4-perfluorobutylsulfonyloxyphenyl)-propane
2,2-bis-(4-silyloxyphenyl)-propane having the formula

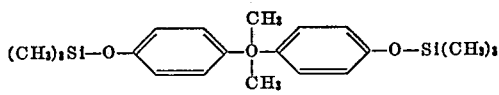

and perfluorobutylsulfonyl fluoride did not react under the conditions described in the preceding examples. Only after heating for several days in an autoclave at 150° C. in the presence of triethylamine was it possible to detect the required perfluorosulfonic acid ester and trimethylfluorosilane. The ester was isolated in the form of an oil: B.P.$_{0.5}$ 188–190° C.; $n_D^{20}$ 1.4327.

The identity of the reaction product was confirmed by its IR, $^1$H—NMR and $^{19}$F—NMR spectra.

*Analysis.*—Calcd.: 34.8% C; 1.8% H; 43.3% F; 8.1% S. Found: 38.7% C; 2.5% H; 42.1% F; 7.4% S.

EXAMPLE 19

Perfluorooctylsulfonic acid 3-aminophenylester 9.0 g. (0.05 mole) of trimethyl-3-aminophenoxysilane were heated while stirring with 26.2 g. (0.0525 mole, 5% excess) of perfluorooctylsulfonyl fluoride and 0.5 g. of caesium fluoride. An exothermic reaction began at around 80° C., being accompanied by the evolution of trimethylfluorosilane. After a reaction time of 1 hour, the solidified product was recrystallized from ligroin in a yield of 23 g. (78% of the theoretical), M.P. 62–65° C. IR, $^{19}$F and $^1$H nuclear resonance spectra confirmed the structure of the compound.

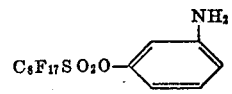

EXAMPLE 20

Perfluorooctylsulfonic acid-4-aminophenylester

As described above, trimethyl-4-aminophenoxysilane was reacted with perfluorooctylsulfonyl fluoride in the presence of CsF as catalyst and, after recrystallization from ligroin, a product identified by spectroscopy and corresponding to the formula

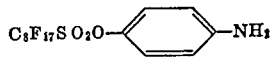

was obtained in a yield of approximately 80%, M.P. approximately 60° C.

EXAMPLE 21

2-perfluorobutylsulfonyloxy-6-amino-pyridine 62.7 g. (0.2 mole) of 96.5% perfluorobutylsulfonyl fluoride and 37.6 g. (0.2 mole) of 96.7% 2-trimethyl-silyloxy-6-amino-pyridine were heated to a temperature of 150° C. in the presence of 3 ml. of triethylamine in an autoclave. Within 36 hours the pressure within the autoclave raised to 12 atm. gauge. After cooling the autoclave was vented to normal pressure. In the autoclave 79.7 g. of a brown product were found of which 95.35% consisted of the required product according to a gas chromatograph. Yield 96.8% of the theoretical. Yellow, leaf-shaped crystals were obtained after recrystallization from carbon tetrachloride. The identity of the reaction product was confirmed by its IR, $^1$H—NMR and $^{19}$F—NMR spectra.

Analysis.—Calc.: 27.6% C; 1.3% H; 43.6% F; 7.1% N; 8.2 S. Crude product.—Found: 27.4% C; 1.9% H; 43.8% F; 6.7% N; 8.5% S. Recryst. product.—Found: 27.8% C; 1.9% H; 43.4% F; 7.0% N; 8.3% S.

EXAMPLE 22

8-perfluorobutylsulfonyloxy-chinoleine 78.2 g. (0.25 mole) of 96.5% perfluorobutylsulfonyl fluoride and 54.3 g. (0.25 mole) of 8-trimethylsilyloxy-chinoleine were heated in the presence of 5 ml. of triethylamine in an autoclave to a temperature of 150° C. for a period of 100 hours. The pressure within the autoclave raised to 7 atm. gauge. According to the IR-spectrum of a gas sample taken out of the autoclave trimethylfluorosilane was formed. The dark reaction product was distilled whereby a yellowish solid product was obtained. B.P.$_{0.9}$ 130–135° C., M.P. 76–78° C., yield 92 g. (86.3% of the theoretical). The identity of the reaction product was confirmed by its IR-, $^1$H—NMR- and $^{19}$F—NMR-spectra.

Analysis.—Calc.: 36.5% C; 1.4% H; 40.0% F; 3.3% N; 7.5% S. Found: 35.9% C; 2.1% H; 38.5% F; 3.5% N; 7.6% S.

EXAMPLE 23

2-perfluorobutylsulfonyloxy-5-amino-naphthaline 78 g. (0.5 mole) of 2-trimethylsilyloxy-5-amino-naphthaline 157 g. (0.5 mole) of 96.3% perfluorobutylsulfonyl fluoride and 5 ml. of triethylamine were heated in an autoclave to a temperature of 150° C. Within 150 hours the pressure raised to 9 atm. gauge. After cooling and venting of the autoclave 205 g. of a black reaction product were isolated. The product was refined by shaking it with a mixture consisting of 50% carbontetrachloride and 50% water which was followed by filtration leaving black tar on the filter. The filtrate was boiled together with active carbon and subsequently filtrated. The CCl$_4$-phase of the filtrate was separated, dried over Na$_2$SO$_4$ and evaporated. The resulting solid was freed from traces of CCl$_4$ in an oil-pump vacuum. The identity of the reaction product was confirmed by its IR-, $^1$H— and $^{19}$F—NMR-spectra.

EXAMPLE 24

Perfluorooctylsulfonyl-p-isopropenylphenylester 43.1 g. (0.2 mole) of 95.7% trimethyl-p-isopropenyl-phenoxysilane and 103.0 g. (0.2 mole) of 97.5% perfluorooctylsulfonyl fluoride were heated with 3 ml. triethylamine to a temperature of 100° C. under stirring in a nitrogen atmosphere. After 5 hours the trimethylfluorosilane evolution was finished. The reaction mixture was fractionally distilled. B.P.$_{0.5}$ 118° C., yield 112 g. (90.9% of the theoretical). The identity of the slightly yellow product was confirmed by its IR-, $^1$H— and $^{19}$F—NMR-spectra.

Analysis.—Calc.: 33.1% C; 1.5% H; 52.4 F; 5.2% S. Found: 32.8% C; 2.1% H; 50.7% F; 5.3% S.

EXAMPLE 25

Perfluorooctylsulfonic acid phenylester 31 g. (0.125 mole) of dimethyl-diphenoxysilane and 139.5 g. (0.25 mole) of 90% perfluorooctylsulfonyl-fluoride were heated with a catalytic amount of triethylamine under reflux up to a temperature of 120° C. The fractional distillation yielded a colorless liquid, B.P.$_{1.5}$ 114° C. The liquid crystallized out at room temperature. The structure of C$_6$H$_5$O.SO$_2$C$_8$F$_{17}$ was confirmed by its IR-, $^1$H and $^{19}$F—NMR-spectra.

Analysis.—Calc.: 29.2% C; 0.9% H; 56.1% F; 5.6% S. Found: 29.5% C; 1.0% H; 54.8% F; 5.3% S.

It will be appreciated that the instant specification and examples are set forth by way of illustration and not limitation, and that various modifications and changes may be made without departing from the spirit and scope of the present invention.

What is claimed is:

1. A process for the production of a perfluoroalkyl-sulfonic acid acryl ester of the formula

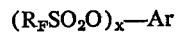

comprising reacting a perfluoroalkyl-sulfonyl fluoride of the formula

with an aryl ester of a silicic acid of the formula

wherein
R$_F$ is a perfluoroalkyl group of 1 to about 12 carbon atoms,
x is 1 or 2,
Ar is phenyl, naphthyl, substituted phenyl or substituted naphthyl where the substituent is at least one amino, carboxyl, alkenyl, halo, trihalomethyl, carbalkoxy or nitro group,
R' is methyl, ethyl or phenyl, and
n is an integer from 0 to 3,
at a temperature of about 20 to 300° C. in the presence of a catalyst selected from the group consisting of trimethylamine, triethylamine, 2,2,4-trimethyl-2-silamorpholine, dimethylbenzylamine, pentamethyldiethylene triamine, triethylene diamine, N-methylmorpholine, pyridine, an alkali metal fluoride and a tetraalkylammonium fluoride.

2. A process according to claim 1, wherein the reaction is carried out at a temperature of from about 50 to 150° C.

3. A process according to claim 1, wherein the reaction is carried out at a pressure of from about 0 to 20 atms. gauge.

References Cited

UNITED STATES PATENTS

| | | | |
|---|---|---|---|
| 3,346,612 | 10/1967 | Hansen | 260—456 R |
| 3,458,571 | 8/1969 | Tokoli | 260—456 A X |
| 3,687,998 | 8/1972 | Trepka | 260—456 A |
| 3,310,552 | 3/1967 | Ischer | 260—456 A |
| 3,415,652 | 12/1968 | Porter | 260—456 A |

FOREIGN PATENTS 1,038,559  9/1958  Germany  260—456 A

J. E. EVANS, Primary Examiner

U.S. Cl. X.R.

71—103; 252—8.75, 545; 260—248 R, 251 R, 289 R, 293.9, 332.3, 347.8, 456 I, 448.2 E, 448.8 R, 444.8 A, 543 F; 424—246, 251, 258, 303

UNITED STATES PATENT OFFICE
CERTIFICATE OF CORRECTION

Patent No. 3,803,199                    Dated April 9, 1974

Inventor(s) PETER VOSS ET AL.

It is certified that error appears in the above-identified patent and that said Letters Patent are hereby corrected as shown below:

Col. 1, line 31, cancel "$R_f$", both instances, and substitute therefor -- $R_F$ --.

Col. 2, lines 50-51, after "4-amino-2 hydroxy" insert --naphthalene, 7-amino-2 hydroxynaphthalene, 2-hydroxy --;

line 51, before " -hydroxy" insert -- 2 --.

Col. 3, line 73, correct spelling of "Pergammon".

Col. 5, line 8, cancel "13%" and substitute therefor -- 1.3% --.

Col. 7, line 44, correct spelling of "temperature".

Col. 8, line 55, cancel line 55 and substitute therefor

-- Found: 35.4%, 2.0%, 43.5%, 8.1%. --.

Col. 9, line 40 and line 44, correct spelling of "chinoline".

Col. 10, line 44 (Claim 1), change "acryl" to -- aryl --.

Col. 10, line 53 (Claim 1), correct formula to read as follows:

-- $(R'_n SiO_{4-n})_x$-Ar --.

Signed and sealed this 14th day of January 1975.

(SEAL)
Attest:

McCOY M. GIBSON JR.
Attesting Officer

C. MARSHALL DANN
Commissioner of Patents